United States Patent

[11] 3,601,485

[72] Inventor Siegfried Barbieri
 Brixen Bei Bozen, Italy
[21] Appl. No. 798,621
[22] Filed Feb. 12, 1969
[45] Patented Aug. 24, 1971
[73] Assignee Durst A.G.
 Bozen, Italy
[32] Priority Oct. 9, 1968
[33] Italy
[31] 2572

[54] METHOD AND APPARATUS FOR MEASURING AND CONTROLLING THE AMOUNTS OF COLORED LIGHT IN THE PRINTING OF PHOTOGRAPHIC TRANSPARENCIES
 20 Claims, 2 Drawing Figs.
[52] U.S. Cl. .................................................. 355/38, 355/77
[51] Int. Cl. .................................................. G03b 27/76
[50] Field of Search .......................................... 355/35, 37, 38, 77

[56] References Cited
 UNITED STATES PATENTS
3,322,025 5/1967 Dauser .......................... 355/35 X
3,418,048 12/1968 Veit .............................. 355/38

Primary Examiner—Samuel S. Matthews
Assistant Examiner—Richard A. Wintercorn
Attorney—Connolly & Hutz ABSTRACT: An apparatus for making prints from colored photographic transparencies performs color measuring and printing either simultaneously or sequentially. In simultaneous operation, part of the light passing through the transparency is utilized to terminate the exposures to the printing light of each of the primary colors. Sequentially auxiliary sources of light of each of the primary colors are adjusted to the same combination and intensity as in a selected portion of the transparency having an arbitrary combination of these colors. The adjusted light is then used to terminate the exposures to the light of each of the primary colors. A semitransparent mirror upon a movable sensing head diverts part of the light passing through the transparencies to terminate the exposures or uses, therefor the light adjusted. A fiber optic samples the combination of colors in a selected portion of the transparency during sequential measuring and projects them upon the sensing head. The auxiliary sources are then adjusted to the same combination and intensity as the selected portion of the transparency and this light is projected upon the sensing head during the sequential printing process to terminate the exposures to each of the primary colors. The sensing head slides back and forth under the focusing lens carrier within which the auxiliary sources of light and an apertured reflector (through which the fiber optic extends) are conveniently mounted with a diaphragm in-between for adjusting the overall intensity of the light from the auxiliary sources.

3,601,485

METHOD AND APPARATUS FOR MEASURING AND CONTROLLING THE AMOUNTS OF COLORED LIGHT IN THE PRINTING OF PHOTOGRAPHIC TRANSPARENCIES

BACKGROUND OF THE INVENTION

This invention relates to the automatic printing of colored photographic transparencies. Processes for making colored prints are known which compensate for color deficiencies in transparencies resulting from various reasons (including: incorrect illumination during exposure of the film, variations in the composition of the processing baths, variations in temperature, and variations in the positive and negative emulsions) by adjusting the amounts of the light components (such as the primary colors blue, green and red) to which the transparency is exposed during printing. Such adjustment may be accomplished by varying either the intensity or the illumination time of the light of the primary colors. Two different types of processes now predominate for measuring and controlling the amounts of the three primary colors to which the color printing material is exposed. One is the simultaneous measuring and printing process in which the amounts of the three primary colors in the printing light is measured during exposure of the transparency and the exposures to each of the primary colors is terminated as soon as a predetermined amount of its light has impinged upon the photosensitive printing material. Such a process is described in U.S. Pat. No. 3,127,267.

Another type of process now being utilized is the sequential measuring and printing process in which the relative color relationship in a selected portion of the transparency having an arbitrary color composition is measured to govern the subsequent exposure of the printing material. Whereas, the simultaneous measuring and printing process is best adapted for rapid economical color printing and enlarging of a wide variety of subjects. The sequential process is better adapted for making high-grade studio and industrial prints of transparencies having a representative portion where color composition can be determined. Such representative portions are, for example, the face of a person or the surface of a small grey card which can be photographed simultaneously with the subject. Their color composition is measured to determine the exposure conditions for the entire transparency. An object of this invention is therefore to provide a method and apparatus which may be alternatively used in the simultaneous or sequential color measuring and printing of colored photographic transparencies. Another object is to provide a method for utilizing a color printing apparatus, having means for individually terminating the exposures to the printing light of each of the primary colors when predetermined quantities thereof have passed through the transparency for performing a sequential as well as a simultaneous type of printing process.

SUMMARY OF THE INVENTION

In accordance with this invention photosensitive elements for the three primary colors are mounted in a sensing head which actuates the control for terminating the exposures to each of the primary colors. This sensing head is movably mounted for alternative actuation by a portion of the light passing through the transparency for simultaneous measuring and printing or by exposure to auxiliary color light sources whose composition and overall intensity are coordinated with that in a selected portion of the transparency having an arbitrary color composition which has been preliminarily measured. A simultaneous measuring and printing apparatus is easily adapted for the sequential process by employing a movable sensing head having a semitransparent divertor which is inserted into the path of the exposure light for the simultaneous process and into the path of light from adjusted auxiliary light sources during the sequential process. The color composition of the selected portion of the transparency is conveniently sampled by a flexible light-conducting fiber which abstracts the light and conducts it to the photosensitive elements in the sensing head. This is better than scanning the projected image in that a much greater light intensity is available at the transparency, which is affected by the enlargement due to projection. Furthermore, there is convenient access to the transparency for sampling in contrast to the projected image which may be remote and difficult to reach, particularly in all projections.

BRIEF DESCRIPTION OF THE DRAWING

Novel features and advantages of the present invention will become apparent to one skilled in the art from a reading of the following description in conjunction with the accompanying drawings wherein similar reference characters refer to similar parts and in which.

DESCRIPTION OF THE PREFERRED EMBODIMENTS

Figure 1:
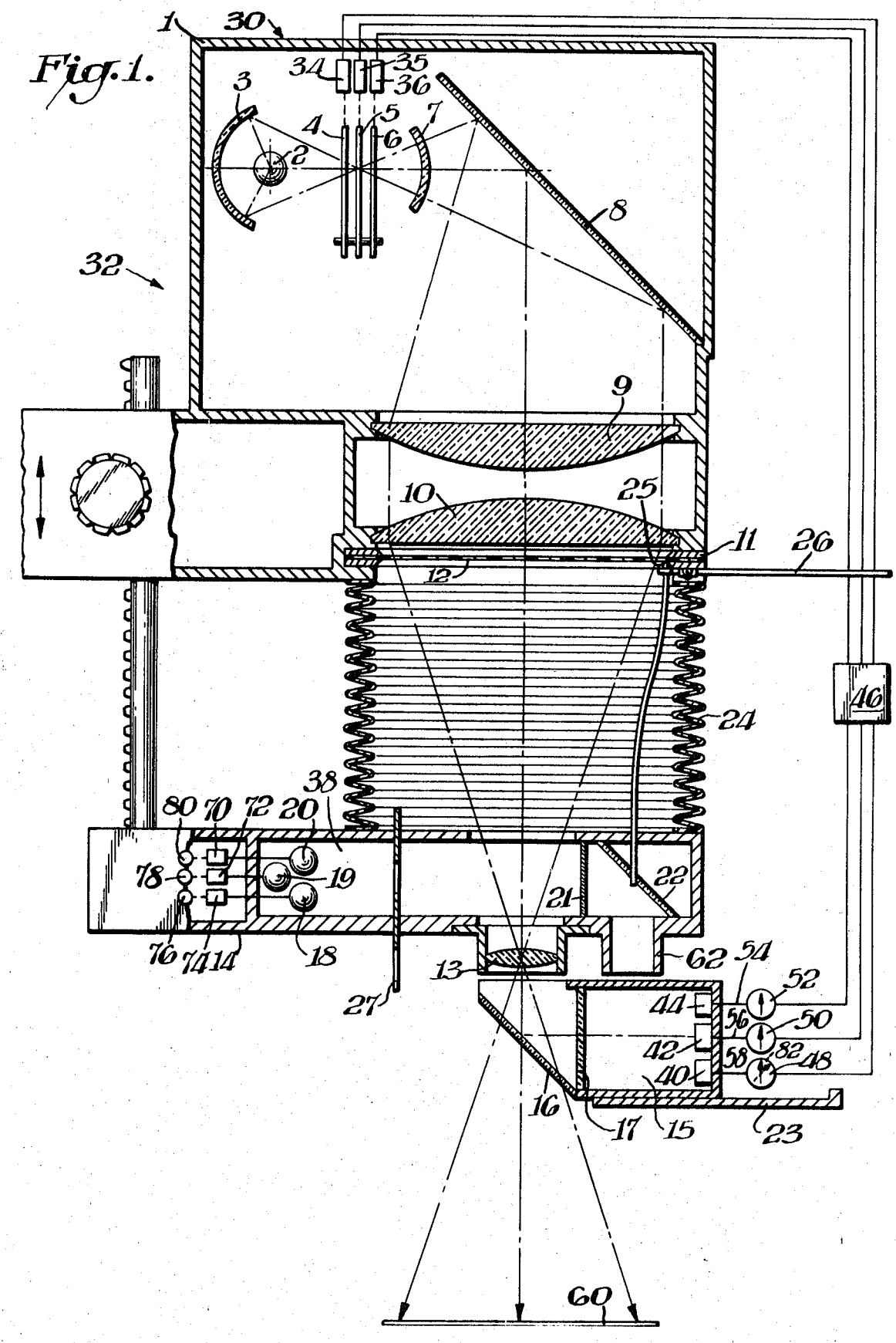
FIG. 1 is a diagrammatic side view in elevation of one embodiment of this invention arranged to perform simultaneous measuring and printing.

In FIG. 1 is shown the projecting head 30 of enlarging and printing device 32 (not completely illustrated). Projecting head 30 includes lamp housing 1 incorporating printing lamp 2, reflector 3, subtractive color filters 4, 5 and 6, opal disc 7, deflecting mirror 8, condenser lenses 9 and 10 and transparency holder 11 with transparency 12 inserted therein. Color filters 4, 5 and 6 are moved in and out of the path of the exposure light by actuating devices 34, 35 and 36 which are, for example, of the type described in U.S. Pat. No. 3,411,847.

Focusing lens 13 is mounted upon the bottom of carrier 14 having chamber 38 within it, later described in detail. Sensing head 15 is movably mounted to slide back and forth under lens carrier 14 over plate 23. Semitransparent mirror 16 is mounted at one end of sensing head 15 and photosensitive elements or cells 40, 42 and 44 corresponding to the three primary colors are mounted within sensing head 15. Elements 40, 42 and 44 may be photoelectric cells, phototransistors or the like and they are sensitized to respond only to specific ranges of the spectrum by the use of filters in the additive primary colors or other means. Each cell 40, 42 and 44 is connected to a typical phototube relay control circuit represented by block 46 for actuating solenoids (not specifically shown) in filter-actuating devices 34, 35 and 36 to interpose corresponding subtractive color filters in the path of the printing light as soon as each cell has been exposed to a predetermined quantity of its color component. Rectangle or block 46 represents for example an assembly of typically phototube relay circuits which may be for example of the type described in a publication entitled "Phototubes" by Radio Corporation of America, Form PT-20R1, 3—48 Copyright 1940, page 14 FIG. 12. Any suitable solenoid-operating relay may be utilized within control component 46 to operate the solenoids in filter-actuating devices 34, 35 and 36. Subtractive color filters 4, 5 and 6, are, for example, of the type described in U.S. Pat. No. 3,411,847.

Meters 48, 50 and 52 are inserted in electrical leads 54, 56 and 58 connecting photosensitive elements 40, 42 and 44 to control component 46. Meters 48, 50 and 52 are, for example, of the ammeter type and indicate the intensity of light sensed by photosensitive elements 40, 42 and 44, which is utilized in a manner later described in detail.

In the position of sensing head 15 shown in FIG. 1, semitransparent reflector or mirror 16 is disposed under focusing lens 13 and thus deflects a small amount of the exposure light passing through transparency 12 and focusing lens 13 upon sheet of photosensitive printing material 60, through opal plate 17 (which diffuses it) before impinging upon color measuring photosensitive cells 40, 42 and 44. Simultaneous measuring and printing is thus accomplished in a manner similar to that described in U.S. Pat. No. 3,127,267. When the exposure process is begun, subtractive color filters 4, 5 and 6 are retracted out of the path of the exposure light by solenoid devices 34, 35 and 36. Copying or printing lamp 2 is then switched on. The light beams that it emits are reflected and concentrated by reflector 3 through curved opal disc 7 which diffuses it. The light beams are then reflected downwardly by reflecting mirror 8 and further concentrated by condensing lenses 9 and 10. These light beams illuminate the original transparency 12 and pass through focusing lens 13 to impinge, in the most part, upon photosensitive printing material 60. A small part of the light passing through the transparency and focusing lens 13 is deflected by semitransparent mirror 16 into sensing head 15 and upon its photosensitive cells 40, 42 and 44. The quantities of light sensed by the cells act through control component 46 and filter-actuating devices 34, 35 and 36 to terminate the exposures of the corresponding color when a predetermined amount of its light has impinged upon corresponding photosensitive cells 40, 42 and 44. The sensitivity of cells 40, 42 and 44 is, of course, coordinated with that of particular printing material 60 being used.

Figure 2:
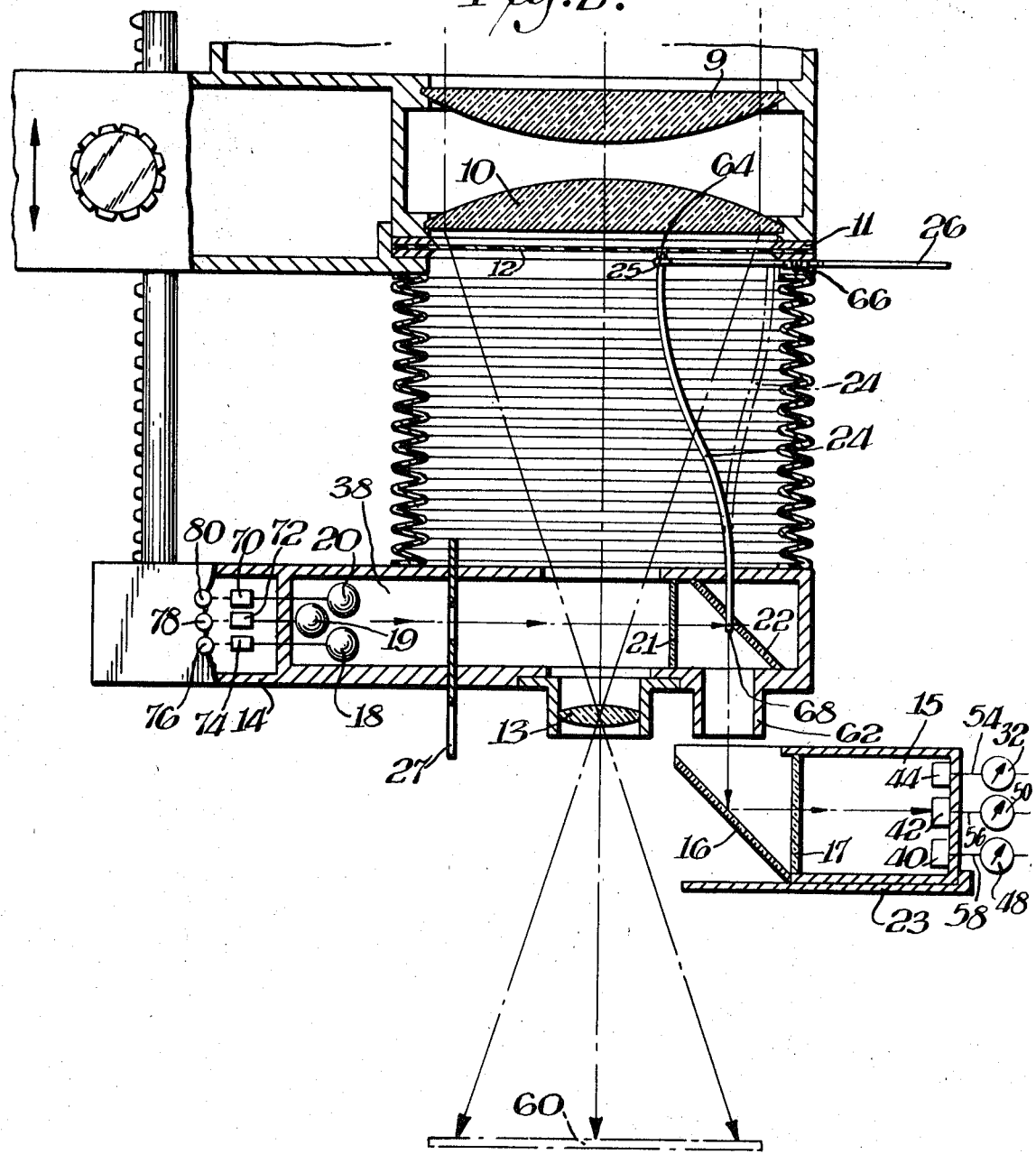
FIG. 2 is a diagrammatic side view in elevation of a portion of the apparatus shown in FIG. 1 arranged to perform sequential measuring and printing.

In FIG. 2 is shown apparatus 32 arranged for sequential measuring and exposing. In this position sensing head 15 is moved to the right with semitransparent mirror 16 out of the path of the rays of light passing through transparency 12 and focusing lens 13. Semitransparent mirror 16 thus receives light through aperture 62 instead of focusing lens 13. The light through aperture 62 is from two alternative sources. One of them is auxiliary sources 18, 19 and 20 of light of the primary colors (blue, green and red). Their lights pass through opal disc 21 (which diffuses it) upon auxiliary light-channeling device 22. Device 22 consists of an apertured mirror which directs light downwardly through aperture 62 onto semitransparent mirror 16. Base plate 23 is opaque and prevents this light from passing downwardly to protect photosensitive sheet 60 from exposure thereby.

During the preliminary light-measuring step, the color content of a selected portion 64 of transparency 12 is sampled and abstracted through light-conducting fiber or fiber optic 24 by positioning the head 25 of fiber 24 under selected portion 64 of transparency 12. Selected portion 64 has a color content which is representative of that in overall transparency. Adjustment of fiber head 25 is accomplished by rod 26, which is for example made of a transparent material such as an acrylic plastic, through universally rotating and sliding coupling 66. Head 25 of fiber optic 24 is easily adjusted to the selected portion of the transparency by determining the projected image at which head end 25 is sharply projected while the remainder of fiber optic 24 retreats backwardly progressively out of focus. The lower end 68 of fiber optic 24 is inserted through aperture of reflector 22 to permit its light to be alternatively directed upon sensing head 15 through semitransparent mirror 16. The intensity of the light of each of the three primary colors is determined on meters 48, 50 and 52 for coordinating the intensities of auxiliary sources of light 18, 19 and 20 with such intensities as later described.

Sources 18, 19 and 20 of the three primary colors (blue, green and red) are suitably colored lamps. They are connected to intensity controls 70, 72 and 74 with which control knobs 76, 78 and 80 are associated. To coordinate them with the exposure light, printing lamp 2 is switched off and knobs 76, 78 and 80 are adjusted to provide the same intensities previously obtained upon meters 40, 48 and 52.

A second adjustment of the overall intensities of lamps 18, 19 and 20 must be accomplished to make it similar to that of the exposure light. Measuring sensing head 15 is accordingly moved into the left-hand position (shown in FIG. 1) and the current from one of the photosensitive cells 40, 42 or 44, such as red-sensitive cell 44, is then determined. Sensing head 15 is then moved back into the right-hand position (shown in FIG. 2) and diaphragm 27 is adjusted to provide the previously measured photoelectric current in meter 52 connected to red-sensitive cell 44.

During the final printing step, fiber optic 24 is retracted out of the exposure light as shown in its broken line position in FIG. 2. Exposure lamp is switched on and the printing paper 60 (also shown in broken line) is exposed in the manner previously described to the full effect of the printing light. Sensing head 15 is now exposed to the light from auxiliary light sources 18, 19 and 20 which have been adjusted to coordinate them with the relative amounts of light in the selected portions of the transparency and also with the overall intensity of the printing light. Mirror 22 reflects the light of the auxiliary sources through semitransparent mirror 16 onto photosensitive cells 40, 42 and 44, which actuate the interposition of substractive filters 4, 5 and 6 to terminate the exposures, in the same manner previously described, as soon as a sufficient predetermined light of each of the primary colors has impinged upon printing material 60. In FIG. 2 base plate 23 is preventing the light from auxiliary sources of light 18, 19 and 20, passing through semitransparent mirror 16, from impinging upon the copying material 60 and interfering with its proper exposure.

I claim:

1. A method of sequentially operating an apparatus for printing colored transparencies having light-responsive and control means for individually terminating the exposures to the printing light of each of the primary colors when predetermined quantities thereof have passed through said transparencies, said method comprising the steps of selecting a portion of said transparencies having an arbitrary combination of said primary colors, adjusting auxiliary sources of light of said primary colors to the same combination as in said selected portion, and utilizing said adjusted auxiliary sources of light of said primary colors to actuate said light-responsive and control means to individually terminate said exposures to said light of said primary colors whereby said transparencies are sequentially measured and printed.

2. A method as set forth in claim 1 wherein the intensity of each of said auxiliary sources of light of said primary colors is separately adjusted in accordance with its content in said selected portion.

3. A method as set forth in claim 2 wherein the overall intensity of said auxiliary sources of light of said primary colors is adjusted substantially in accordance with the overall intensity of said printing light transmitted through each of said transparencies.

4. A method as set forth in claim 3 wherein said overall intensity is substantially adjusted in accordance with the light of one of said primary colors issuing from said auxiliary sources.

5. A method as set forth in claim 3 wherein said overall intensity is adjusted by adjusting a diaphragm disposed in the paths of light from said auxiliary sources.

6. An apparatus for simultaneously and sequentially measuring and printing colored transparencies comprising exposure means for projecting printing light of the primary colors through said transparencies, light-responsive and control means for terminating the exposures to the light of each of said primary colors when predetermined quantities thereof have passed through said transparencies, analyzing means for measuring the relative intensities of the light of each of said three primary colors in a selected portion of said transparency, auxiliary sources of said light of each of said primary colors, varying means connected to said auxiliary sources for adjusting the relative intensities of said light of each of said primary colors in accordance with said relative intensities determined by said analyzing means, and light-channeling means for directing either a portion of said printing light passing through said transparencies or the adjusted light from said auxiliary sources upon said light-responsive and control means whereby simultaneous or sequential measuring and printing are alternatively accomplished.

7. An apparatus as set forth in claim 6 wherein said analyzing means includes sampling means for abstracting and projecting the light from said selected portion of said transparency.

8. An apparatus as set forth in claim 6 wherein said analyzing means includes light-evaluating means for comparing said light of each of said primary colors derived from said selected portion of said transparencies with that from said auxiliary sources whereby said adjustment of said light of said primary colors from said auxiliary sources is guided.

9. An apparatus as set forth in claim 6 wherein said light-responsive and control means and said analyzing means include light-measuring means for each of said primary colors.

10. An apparatus as set forth in claim 6 wherein said movable means connects said light-channeling means to said apparatus for alternatively interposing said light-channeling means in said light passing through said transparencies for simultaneously measuring and printing and for disposing said light-channeling means in the path of light from said auxiliary sources during sequential printing after measuring.

11. An apparatus as set forth in claim 10 wherein said light-channeling means comprises a semitransparent mirror.

12. An apparatus as set forth in claim 11 wherein said movable means comprises slide means.

13. An apparatus as set forth in claim 10 wherein said light-responsive and control means includes photosensitive means, said semitransparent reflector and said photosensitive means being mounted upon a sensing head, and slide means connects said sensing head to said apparatus.

14. An apparatus as set forth in claim 13 wherein said apparatus includes a focusing lens, said focusing lens being mounted upon a carrier, said analyzing means including sampling means for abstracting and projecting said selected portion of said light, said sampling means also being mounted upon said carrier, and said slide means being constructed and arranged to permit said semitransparent reflector to be alternatively disposed in the path of light from said focusing lens or said sampling means.

15. An apparatus as set forth in claim 14 wherein said auxiliary sources of light are mounted upon said carrier, and auxiliary light-channeling means is mounted on said carrier for directing light from said sampling means and said auxiliary sources of light upon said semitransparent reflector.

16. An apparatus as set forth in claim 15 wherein said carrier includes a chamber, said auxiliary sources of light being mounted at one end of said chamber, a portion of said sampling means and said auxiliary light-channeling means being mounted at another end of said chamber, said focusing lens being mounted at an intermediate portion of said chamber, and a pair of apertures in said chamber associated with said focusing lens and said auxiliary light-channeling means where through light is alternatively directed to said semitransparent reflector.

17. An apparatus as set forth in claim 16 wherein said auxiliary light-channeling means comprises an apertured mirror, said sampling and abstracting means comprise light-conducting fiber, and one end of said light-conducting fiber passing through said apertured reflector.

18. An apparatus as set forth in claim 17 wherein said apparatus includes a transparency holder, and adjustable support means movably mounts the other end of said light-conducting fiber adjacent said transparency holder for projecting light from said selected portion of said transparency to said auxiliary light-channeling means.

19. An apparatus as set forth in claim 17 wherein said adjustable diaphragm means is mounted in said chamber between said auxiliary sources of light and auxiliary light-channeling means whereby the overall intensity of the light from said auxiliary sources of light is adjusted.

20. An apparatus as set forth in claim 18 wherein said semitransparent reflector is mounted at one end of said sensing head, and said photosensitive means is mounted within said sensing head.